(12) United States Patent
Kivimaki et al.

(10) Patent No.: US 6,785,816 B1
(45) Date of Patent: Aug. 31, 2004

(54) SYSTEM AND METHOD FOR SECURED CONFIGURATION DATA FOR PROGRAMMABLE LOGIC DEVICES

(75) Inventors: Tommi Kivimaki, Tampere (FI); Tero Karkkainen, Tampere (FI)

(73) Assignee: Nokia Corporation, Irving, TX (US)

( * ) Notice: Subject to any disclaimer, the term of this patent is extended or adjusted under 35 U.S.C. 154(b) by 0 days.

(21) Appl. No.: 09/561,965

(22) Filed: May 1, 2000

(51) Int. Cl.[7] .............................................. G06F 17/00
(52) U.S. Cl. ...................... 713/181; 713/150; 713/151
(58) Field of Search .............................. 713/182–186, 713/187–194, 100, 150–154, 168–181; 380/255, 247

(56) References Cited

U.S. PATENT DOCUMENTS

| | | | |
|---|---|---|---|
| 5,457,408 A | 10/1995 | Leung | |
| 5,970,142 A | 10/1999 | Erickson | |
| 6,598,164 B1 * | 7/2003 | Shepard | 713/189 |
| 6,640,304 B2 * | 10/2003 | Ginter et al. | 713/193 |
| 6,640,305 B2 * | 10/2003 | Kocher et al. | 713/194 |

FOREIGN PATENT DOCUMENTS

| | | |
|---|---|---|
| WO | 9914652 | 3/1999 |
| WO | 9946774 | 9/1999 |

OTHER PUBLICATIONS

Komninos et al., Security enhancements for A5/1 without losing hardware efficiency in future mobile systems, 3G Mobile Communication Technologies, 2002, Third International Conference on (Cof. Publ. No. 489), May 8–10, 2002, pp. 324–328.*

Trinidad, Programmable encryption for wireless and network applications, MILCOM 2002, Proceedings, vol. 2, Oct. 8–10, 2002, pp. 1374–1377, vol. 2.*

Hasan et al., Smart telephone design–caller identification and answering machine, Semiconductor Electronic, 1998, Proceedings, ICSE '98, 1998, IEEE International Conference on, Nov. 24–26, 1998, pp. 217–222.*

\* cited by examiner

*Primary Examiner*—David Jung
(74) *Attorney, Agent, or Firm*—Antonelli, Terry, Stout & Kraus, LLP

(57) ABSTRACT

Methods and systems for secured configuration data for a programmable device. One or more memory devices store configuration data that includes one or more configuration bitstreams and associated authentication tags for each configuration bitstream. Each authentication tag is created using the associated configuration bitstream. A programmable device operably connected to the one or more memory devices receives one of the configuration bitstreams. The programmable device uses the associated authentication tag of the configuration bitstream to verify that the configuration bitstream is authentic. The programmable device loads the configuration bitstream if the one of the configuration bitstream is authentic, or may discard it otherwise.

15 Claims, 11 Drawing Sheets

SYSTEM AND METHOD FOR SECURED CONFIGURATION DATA FOR PROGRAMMABLE LOGIC DEVICES

BACKGROUND

1. Field of the Invention

This invention relates to programmable logic devices, and more specifically to secured configuration data for programmable logic devices.

2. Background Information

Programmable devices, e.g., Field Programmable Gate Arrays (FPGA), are used in many commercial digital devices. When a device such as this is turned on, the FPGA must be configured with a configuration bit stream. This bit stream is initially stored into an external memory, in most cases, before being loaded into the FPGA. This creates a security risk, since the design data (configuration bit stream) can be read from a data bus attached to the memory during the configuration. A person who knows the structure of the bit stream can interrupt the whole design inside the FPGA.

FIG. 1 shows the block diagram of an example system for loading a configuration bit stream into a programmable device. As shown in FIG. 1, a memory containing the bit stream 4 may reside on a card or other electronic device 2. The bit stream is read by programmable device 6, and used to configure the programmable array 8 of programmable device 6.

If embedded programmable device cores (e.g., programmable arrays) are used inside an application specific integrated circuit (ASIC), the problem of the configuration design data being read may be prevented if the configuration data fits in the internal memory of the application specific integrated circuit. Most often the internal memory space of the application specific integrated circuit is too limited to store all of the configuration data. As the use of dynamically reconfigurable logic increases, this problem becomes even worse. Dynamically reconfigurable designs may have many configuration bit streams, which just increases the amount of configuration data. Therefore, it is even more unlikely that all the configuration data will fit into the internal memory of an application specific integrated circuit. Dynamically reconfigurable logic allows hardware designs to be updated externally. Therefore, designs must somehow be protected in order to allow transmission of configuration data through unsecure systems. Without protection, competitors or hostile persons may access, interpret, and modify configuration bit streams that define valuable designs.

BRIEF DESCRIPTION OF THE DRAWINGS

The present invention is further described in the detailed description which follows in reference to the noted plurality of drawings by way of non-limiting examples of preferred embodiments of the present invention in which like reference numerals represent similar parts throughout the several views of the drawings and wherein.

DETAILED DESCRIPTION

Figure 1:
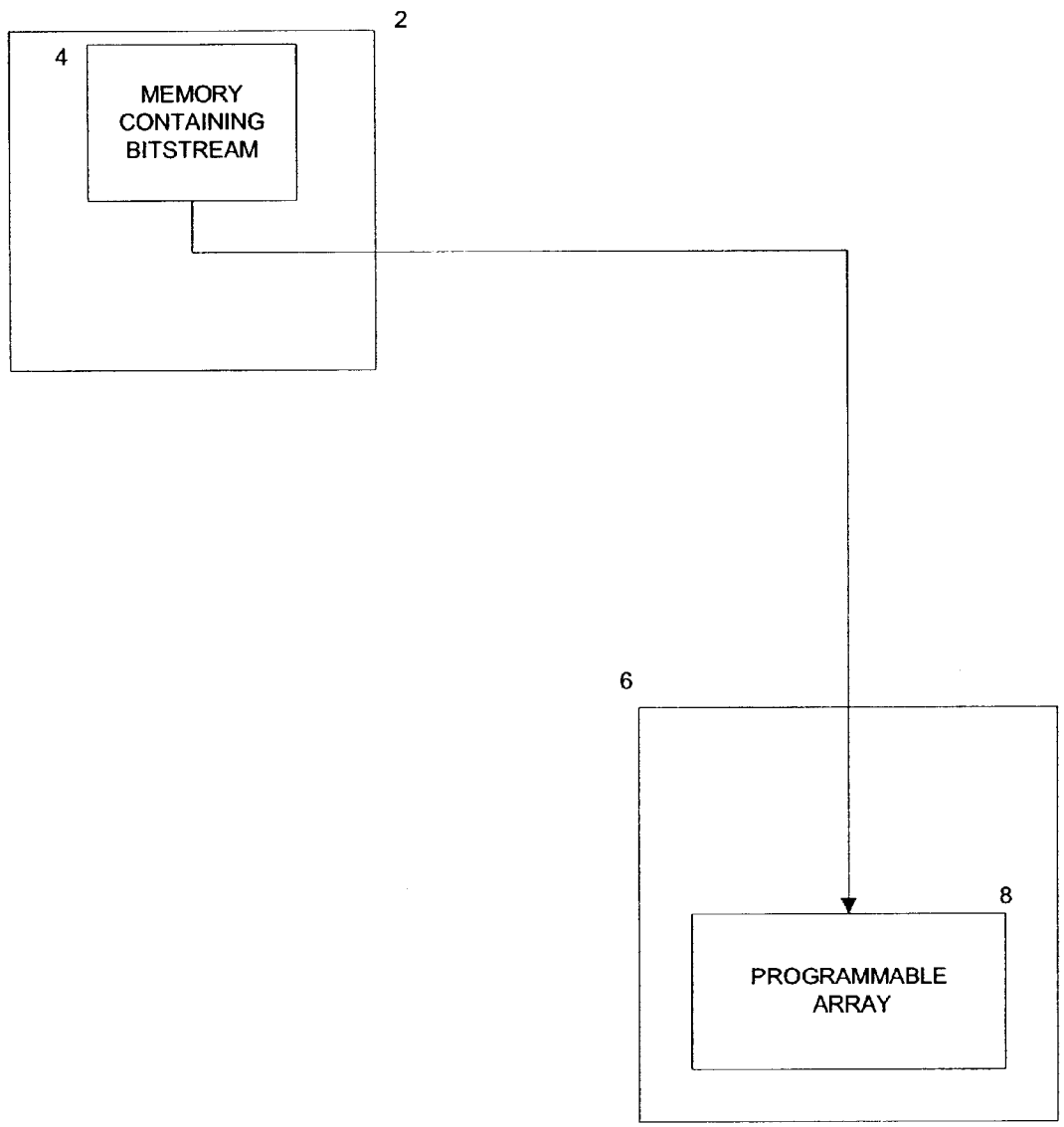
FIG. 1 is a block diagram of an example system for loading a configuration bitstream into a programmable device.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements may be highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hardwired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to how to secure configuration bit streams in a way that other persons cannot interpret or modify them. The invention also provides methods to decide whether bit streams downloaded from a network or other source comes from a trusted source. The security, integrity check, and trustworthiness are achieved by applying authentication and encryption methods together with optional digital envelopes.

According to the present invention, providing security to the configuration data does not have an effect on the standard design flow. The designer uses the same methods and tools to carry out the design as before. After the bit stream is generated, the present invention may be applied. This process may be made to function fully automatically without any user (designer) intervention.

There are two ways to secure the configuration data, with or without digital envelope technique. Without digital envelopes, the procedure is simpler. However, it may require that the secret encryption key be hardwired to the programmable device and never changed. This may be a drawback of this simple method, since keeping the same key forever decreases the security. To increase the security, keys may have a limited lifetime. The shorter the lifetime the harder it is to break the encryption.

Digital envelope techniques allow frequent key changes. This makes the security process a bit more complex. Only public key encryption and key generation must be added to the work flow. Digital envelope techniques provide more security since the secret key used to encrypt the bit stream may be changed as frequently as desired.

Figure 2:
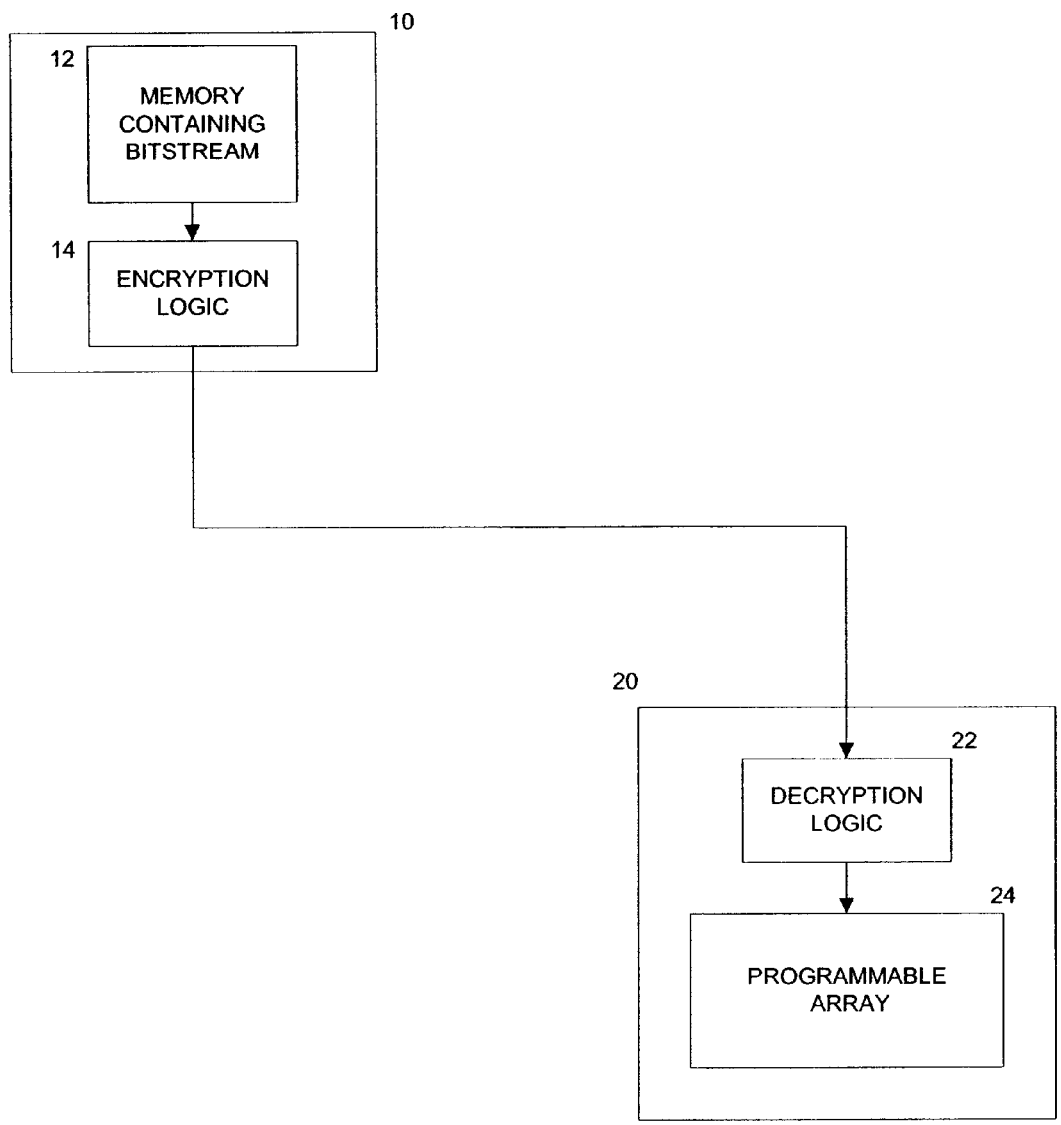
FIG. 2 is a block diagram of an example system for loading secured configuration bitstreams into a programmable device according to an example embodiment of the present invention.

FIG. 2 shows a block diagram of an example system for loading secured configuration bit streams into a programmable device according to an example embodiment of the present invention. Logic device 10 may contain a memory 12 containing a bit stream. Application specific integrated circuit 20 contains a programmable array that can be dynamically reconfigured to represent different logical connections. The bit stream contained in memory 12 is encrypted by encryption logic 14 and then sent over to application specific integrated circuit 20. At application specific integrated circuit 20, the encrypted bit stream is decrypted by decryption logic 22. The decrypted bit stream is then used to dynamically configure the programmable array 24. Decryption logic 22 and programmable array 24 are shown as being a part of an ASIC, however, they may reside on any other electronic device or alone and still be within the spirit and scope of the present invention.

Figure 3:
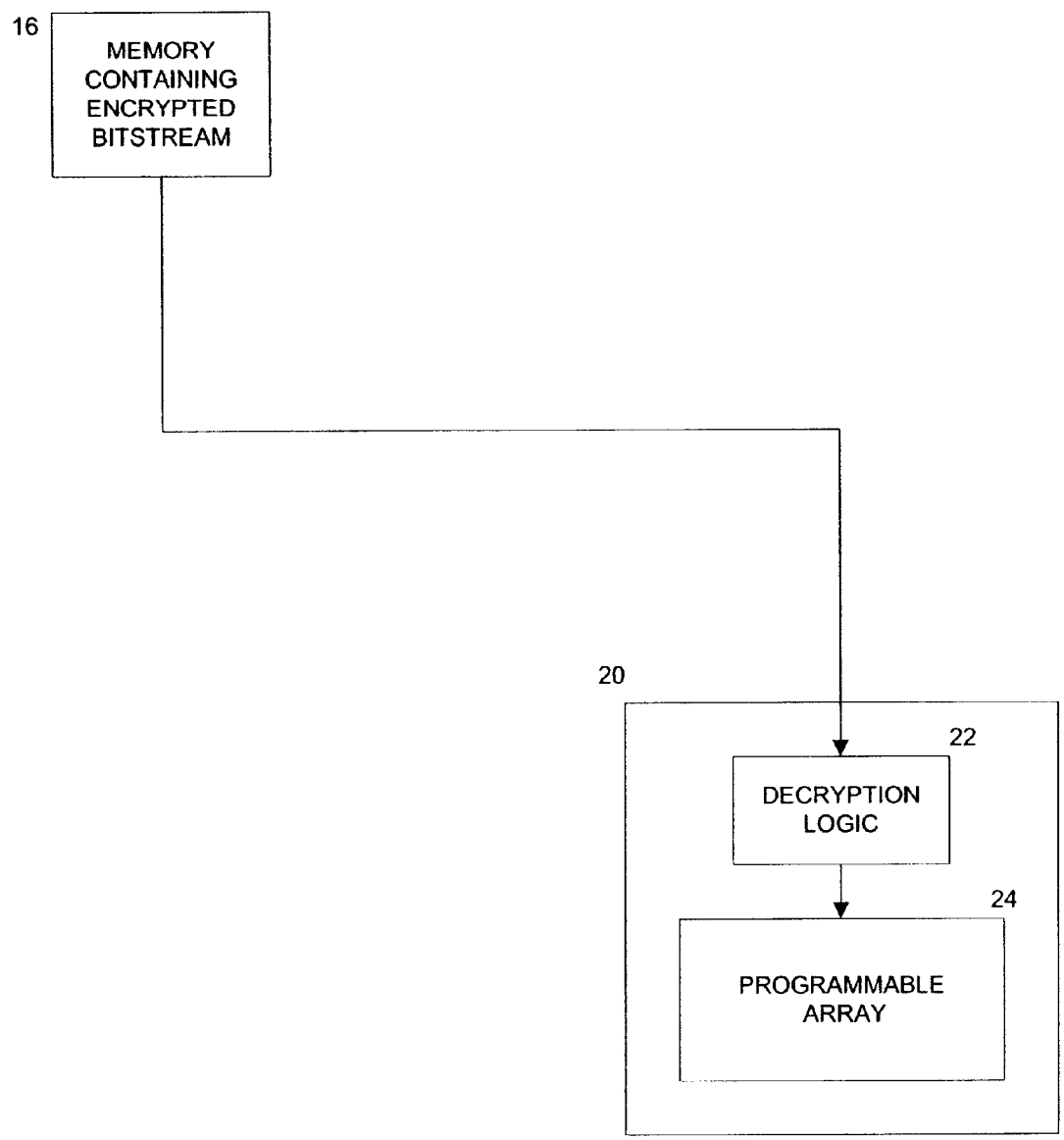
FIG. 3 is a block diagram of an example system for loading a configuration bit stream into a programmable device from a memory where the configuration bit stream is already encrypted according to an example embodiment of the present invention.

FIG. 3 shows a block diagram of an example system for loading a configuration bit stream into a programmable device from a memory where the configuration bit stream is already encrypted. As shown in FIG. 3, the only difference between FIG. 2 and FIG. 3 is that the data has already been encrypted before being stored in memory 16. Memory 16 may reside on a logic device, or may be attached to a bus, or a network.

Figure 4:
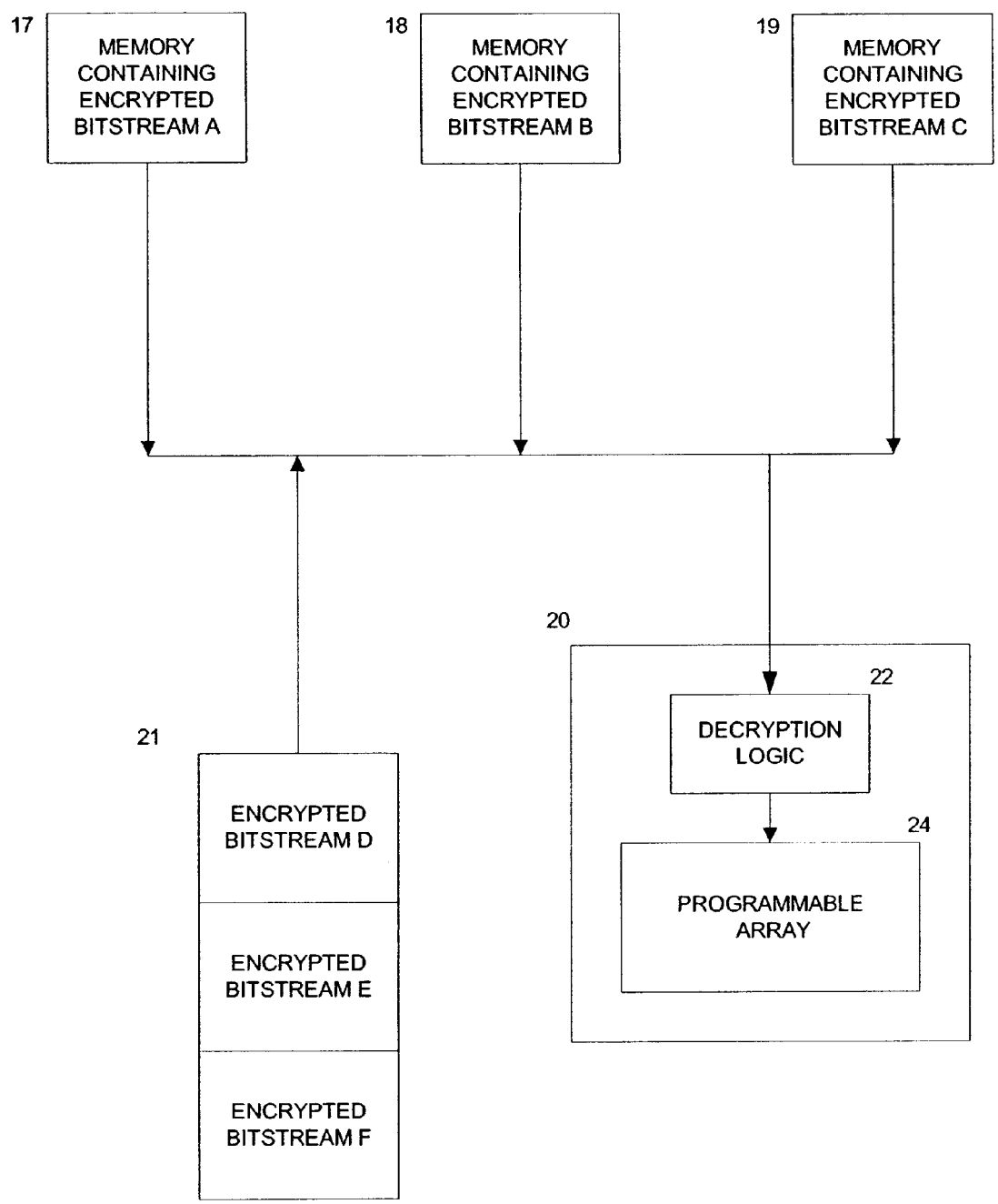
FIG. 4 is a block diagram of an example system where an application specific integrated circuit has access to multiple encrypted bit streams according to an example embodiment of the present invention.

FIG. 4 shows a block diagram of an example system where an application specific integrated circuit has access to multiple encrypted bit streams according to an example embodiment of the present invention. As shown in FIG. 4, application specific integrated circuit 20 may receive encrypted bit streams from memories 17, 18, 19, or 21.

Memory 17, 18 and 19 each may contain one encrypted bit stream (bit stream A, B and bit stream C respectively). Memory 21 however, includes three encrypted bit streams, encrypted bit stream D, encrypted bit stream E and encrypted bit stream F. Application specific integrated circuit 20 may receive information, such as input data, from some source (e.g., processor) which tells application specific integrated circuit 20 what it must do. Application specific integrated 20 may then read the encrypted bit stream from the appropriate memory based on the task that application specific integrated circuit 20 must perform at this time. For example, if application specific integrated circuit 20 is to perform a filtering operation, it may read the encrypted bit stream A from memory 17. Encrypted bit stream A, once decrypted by decryption logic 22, may configure programmable array 24 to be a particular filter. Further, application specific integrated circuit 20 may be instructed to perform a different filtering operation. In this case, application specific integrated circuit 20 may read encrypted bit stream C from memory 19. Encrypted bit stream C once decrypted by decryption logic 22 may then configure programable array 24 such that application specific integrated circuit 20 performs a different filtering function.

In generation of secured configuration data without digital envelopes according to the present invention, standard design flow is used to carry out the design and to generate the bit stream. An authentication tag is derived from the bit stream. The tag may then be appended to the bit stream and the resulting bit stream encrypted using a secret key cryptography. The secret key may have to be agreed upon before hand and it may be used to encrypt all configuration data intended for a particular programmable device. The resulting deciphered bit stream and authentication tag make up the secured configuration data, which may then be supplied to the programmable device.

Figure 5:
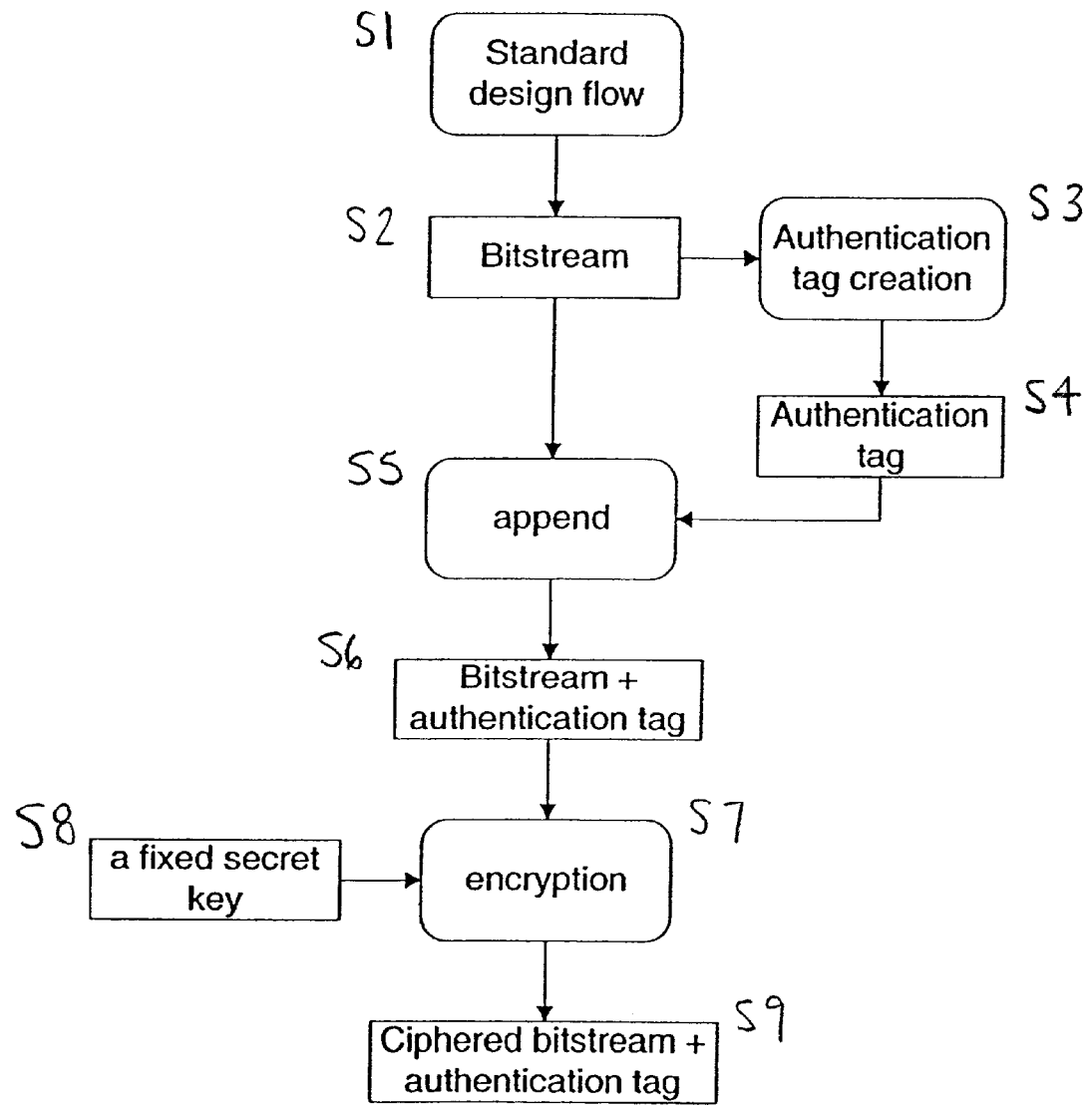
FIG. 5 is a flow chart of an example process for generation of secured configuration data without digital envelopes according to an example embodiment of the present invention.

FIG. 5 shows a flow chart of an example process for generation of secured configured data without digital envelopes according to an example embodiment of the present invention. A designer of a programmable device may follow a standard design flow S1. From this design, a bit stream may be created S2. The bit stream is used to create an authentication tag S3. The resultant authentication tag S4 is then appended to the original bit stream S5. Thus, the bit stream plus the authentication tag appended thereto is created S6. A fixed secret key S8 is then used to encrypt S7 the bit stream plus the authentication tag. The result is a ciphered bit stream plus authentication tag S9. The ciphered bit stream plus authentication tag may then be stored in a memory.

Figure 6:
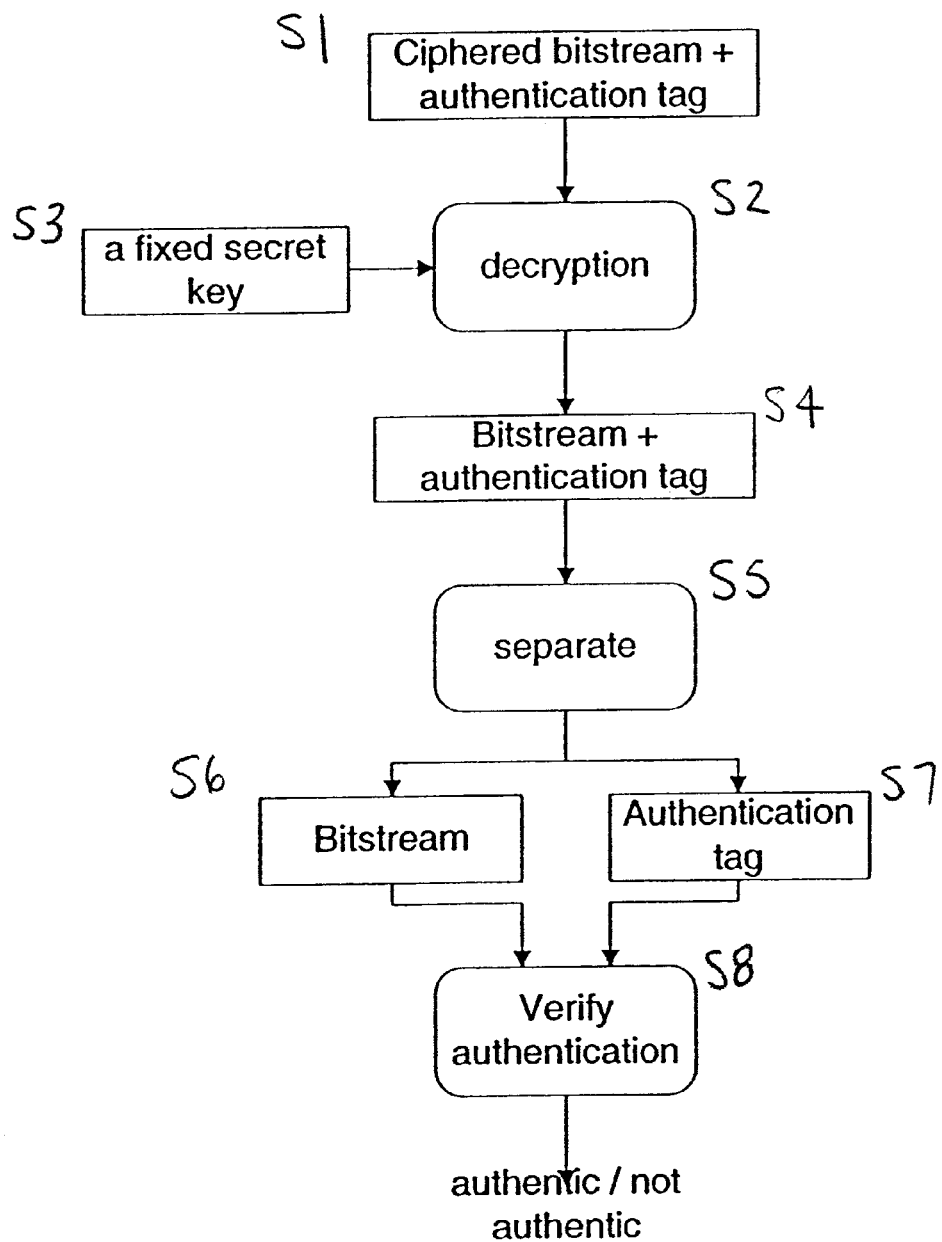
FIG. 6 is a flow chart of an example process for downloading secured configuration data without digital envelopes according to an example embodiment of the present invention.

FIG. 6 shows a flow chart of an example process for downloading secured configuration data without digital envelopes according to an example embodiment of the present invention. An application specific integrated circuit may read a ciphered bit stream and authentication tag, i.e., encrypted configuration data, from a memory S1. A fixed secret key S3 may then be used to decrypt S2 the ciphered bit stream and authentication tag. The fixed secret key used for decryption is the same that was used in FIG. 5 to encrypt the bit stream and authentication tag. The result of the decryption is the original bit stream and authentication tag S4. The bit stream and authentication tag are then separated S5 into the bit stream S6 and the authentication tag S7. The authentication tag is then checked and verified S8 to determine if the bit stream is authentic. If the bit stream is authentic it may then be used to configure the programmable array. However, if the bit stream is determined not to be authentic, it may be ignored and discarded. When the programmable array receives a secured configuration data, it first reads the hardwired secret key. It then applies the secret key to the decryption process to acquire the bit stream and authentication tag in a plain text format. After the authentication tag is separated from the bit stream, the authenticity of the bit stream is verified. If the bit stream is found to be authentic, the bit stream may then be immediately written into the configuration memory of the programmable array.

In generation of secured configuration data with digital envelopes according to the present invention, standard design flow may be used to carry out the design and generate the bit stream. An authentication tag is derived from the bit stream and it is then appended to the bit stream. A secret key is generated and then applied to the encryption process to get a ciphered bit stream and an authentication tag. The secret key is also encrypted using public key cryptography with the programmable array's public key. After that, the ciphered bit stream and authentication tag is appended to the encrypted secret key. The resulting bit stream is secured configuration data that may be then delivered to the programmable array.

Figure 7:
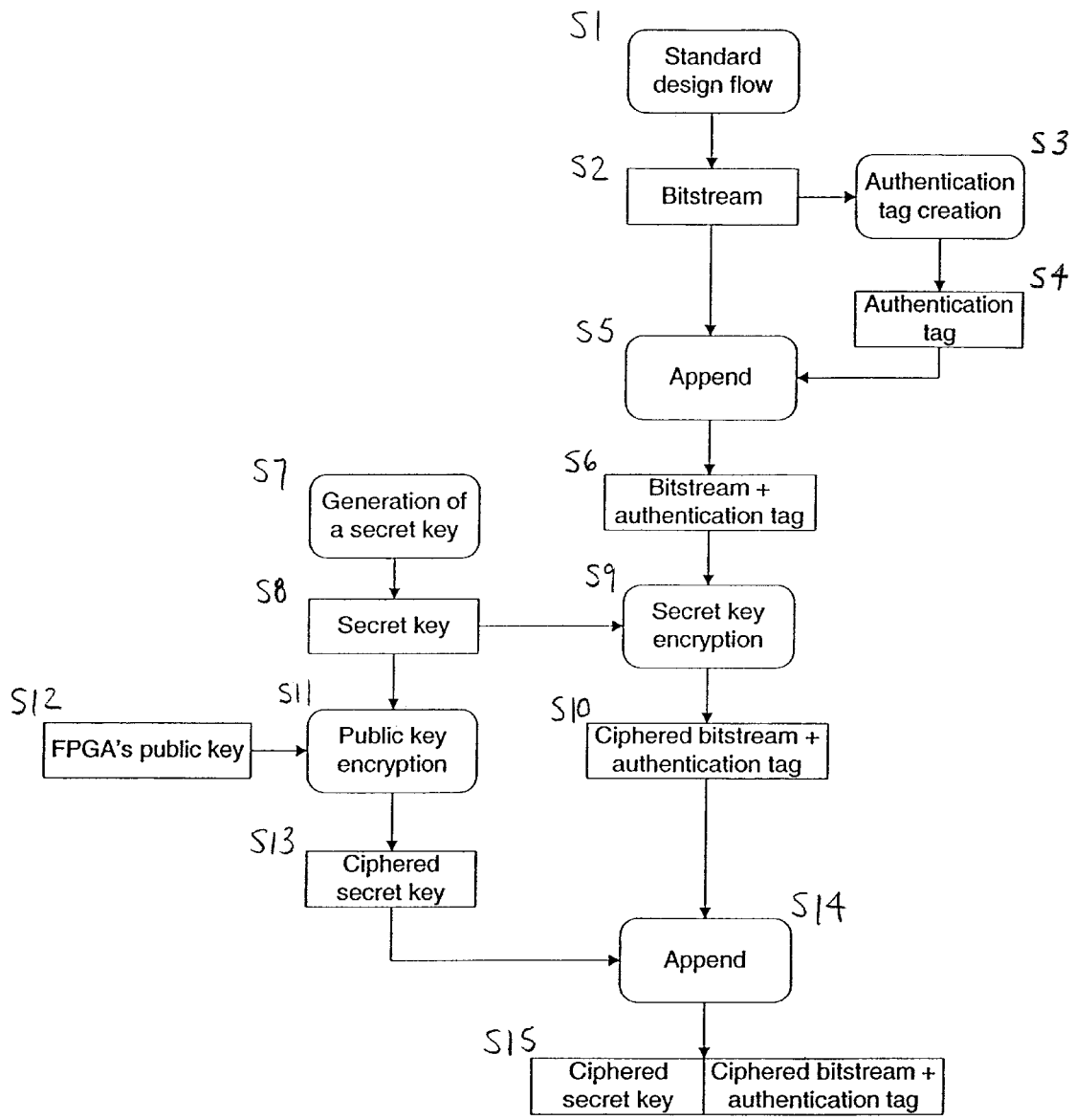
FIG. 7 is a flow chart of an example process for generation of secured configuration data with digital envelopes according to an example embodiment of the present invention.

FIG. 7 shows a flow chart of an example process for generation of secured configuration data with digital envelopes according to an example embodiment of the present invention. The designer may follow a standard design flow S1 for design of the bit stream. From the design, a bit stream is created S2. The bit stream is used to created an authentication tag S3. The authentication S4 may then be appended to the original bit stream S5. Therefore, the bit stream plus authentication tag is created S6. Concurrently, a secret key may be generated S7. The generated secret key S8 may be used to encrypt the bit stream and authentication tag S9. The secret key may be encrypted S11 using a public key S12 of the programmable array. The programmable array's public key S12 may be hardwired at the programmable array. This creates a ciphered secret key S13. A ciphered bit stream and authentication tag S10 may be appended to the ciphered secret key S13 in step S14. This creates a ciphered secret key and ciphered bit stream and authentication tag S15 which may be then be stored in a memory.

Therefore, a digital envelope consists of a data encrypted using a secret key cryptography and a secret key encrypted using public key cryptography. With this technique, the secret key does not have to be hardwired at the programmable array since it is delivered with the data. It is also very easy to change the secret key as frequently as needed. Changing the secret key very often is beneficial since it may be more difficult for an adversary or another to find a key that is only used for a short period of time. If an adversary, however, can find the key, only a small amount of data (designs) may be revealed due to the frequent key changes.

Public key cryptography is harder to break than secret key cryptography. However, secret key crypto systems may have a much higher performance and capacity to encrypt large data files. This is why secret key cryptography may be used to encrypt configuration data, and the use of public key cryptography may be limited to encrypt the secret key only. Every programmable array may require a hardwired public and private key pair. Public key cryptography generally uses larger keys, e.g., 1024 bits, 2048 bits, etc., providing better security than secret key cryptography. This larger key size may be a slight drawback since storing larger keys may require more die area on the FPGA. However, the key size may still be very reasonable and it may not be a problem to have keys with these sizes hardwired into the FPGA.

Figure 8:
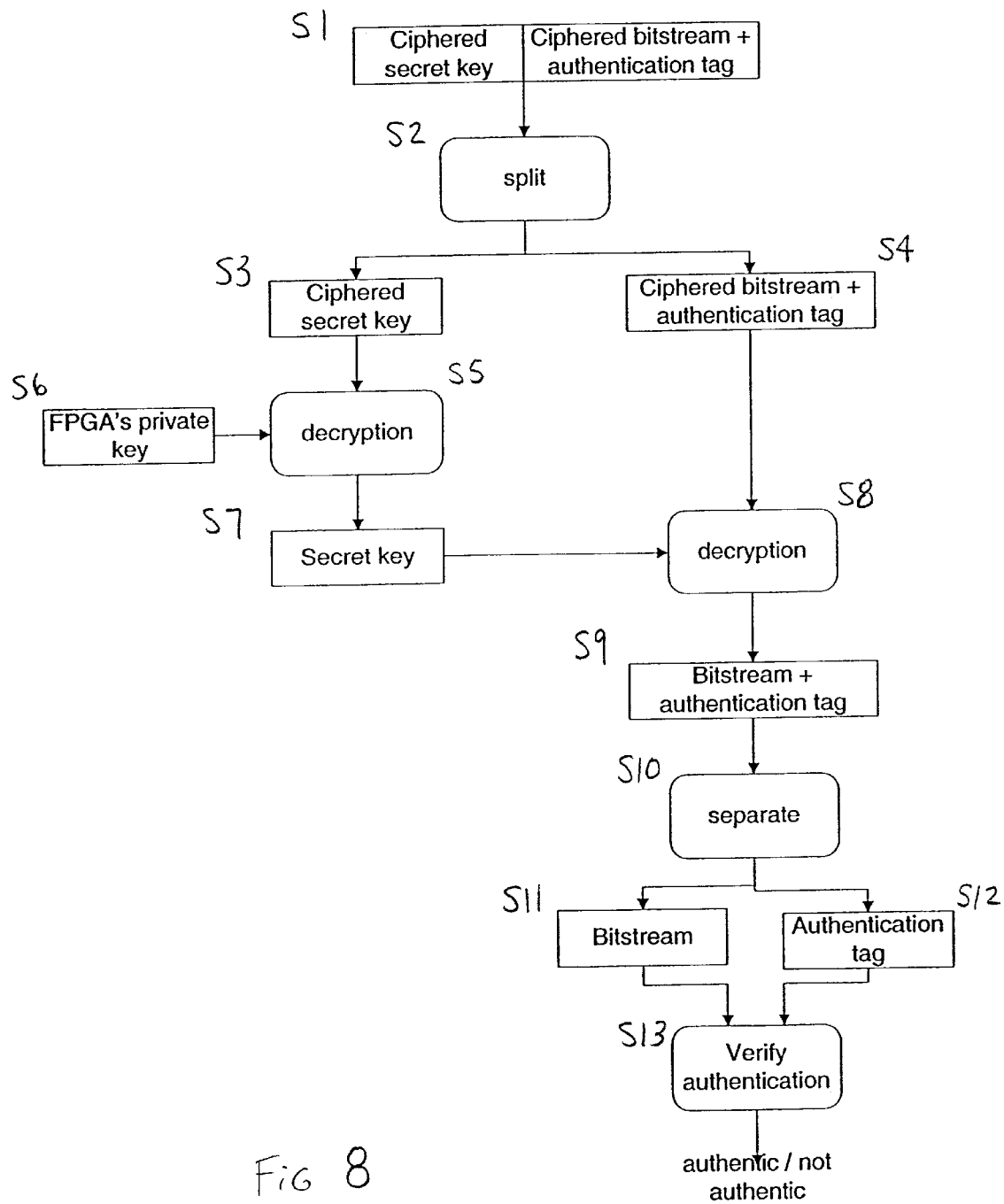
FIG. 8 is a flow chart of an example process for downloading secured configuration data with digital envelopes according to an example embodiment of the present invention.

FIG. 8 shows a flow chart of an example process for downloading secured configuration data with digital envelopes according to an example embodiment of the present invention. An application specific integrated circuit containing a programmable array may read a ciphered secret key and ciphered bit stream plus authentication tag from a memory S1. The ciphered key and ciphered bit stream and authentication tag may then be split S2 into ciphered secret key S3 and the ciphered bit stream and authentication tag S4. A private key S6 of the programmable array may then be used to decrypt S5 the ciphered secret key S3, thereby, producing the original secret key S7. This secret key may then be used to decrypt S8 the ciphered bit stream and authentication tag S4. This produces the original bit stream and authentication tag S9. These two are separated S10 into the bit stream S11 and authentication tag S12. The authentication tag is then verified to determine if the bit stream is authentic S13. If the bit stream is authentic then it may be used to configure the programmable array, however, if the bit stream is not authentic it may be discarded.

Therefore, in downloading secured configuration data with digital envelopes according to the present invention, a deciphered secret key may be separated from the ciphered bit stream and the authentication tag. The ciphered secret key may be decrypted using the programmable array's private key. The secret key may then be in plain text format and may then be applied to the secret key cryptography procedure to decrypt the bit stream and authentication tag. The plain text bit stream and the authentication tag are separated and the authenticity of the bit stream is verified. If the bit stream is found to be authentic, it may then be immediately written into the configuration memory of the programmable array, otherwise the bit stream may be discarded.

According to the present invention, an authentication tag may be created using a hash function based message authentication algorithm, often called an HMAC. Another alternative may be to use a block cipher based authentication algorithm. In this case, the same block cipher may be used to encrypt a bit stream and to generate an authentication tag. Any of many hash functions may be used, e.g., MD5, SHA-1, etc. HMAC uses the hash function with a secret key. Using a secret key for message authentication, according to the present invention, provides two features: the origin of the bit stream may be verified, and only the intended receiver can do this verification process.

Figure 9:
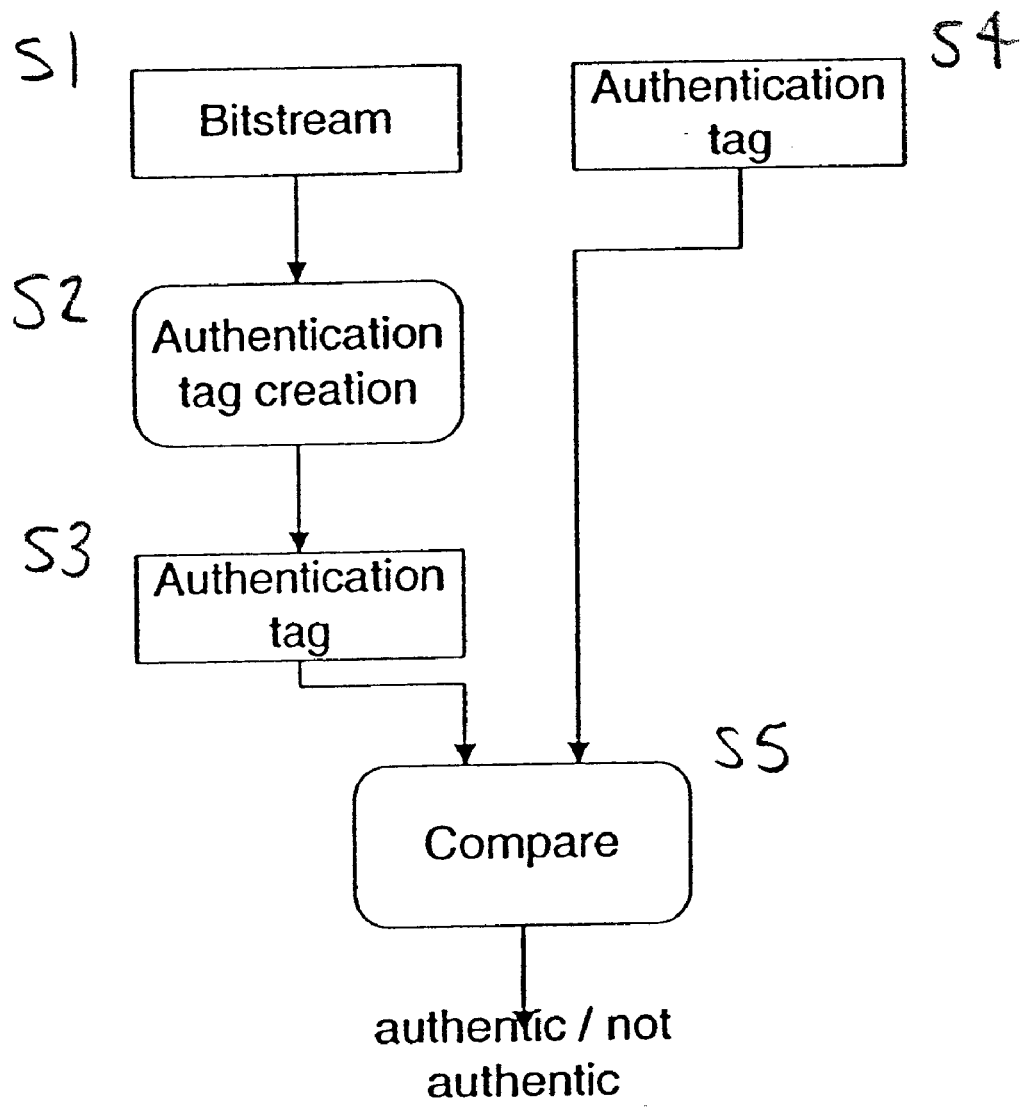
FIG. 9 is a block diagram of example process for verifying authentication tags according to an example embodiment of the present invention.

FIG. 9 shows a block diagram of an example process for verifying authentication tags according to an example embodiment of the present invention. This authentication process occurs at the application specific integrated circuit, or other device containing the programmable array. The bit stream S1 and authentication tag S4 are received at the application specific integrated circuit. The bit stream S1 may then be used to create an authentication tag S2. This authentication tag that has been created at the application specific integrated circuit, S3 is then compared S5 with the received authentication tag S4 to determine if they are the same. If there is a match then the received authentication tag is determined to be authentic, whereas if they do not match, the authentication tag is determined to be not authentic. If the authentication tag is authentic, the bit stream is assumed to be authentic.

The secret key for the authentication process may be either the same key, as is used to encrypt the bit stream, or a different key intended just for authentication. If a different key is used for authentication and digital envelope technique is not used, the key may be hardwired at the programmable array. If digital envelope technique is used, the authentication key may be encrypted using public key cryptography and a programmable array's public key. The ciphered authentication key may then be appended to the configuration data similar to the ciphered secret key. If the same key is used for authentication and bit stream encryption, nothing may need to be done.

The bit stream may be verified using a similar process as was used when the authentication tag was created. The same algorithm may be applied to the bit stream and an authentication tag is acquired as a result. This newly created authentication tag may be compared to the tag delivered along with the bit stream. If they match, the bit stream is authentic.

Figure 10:
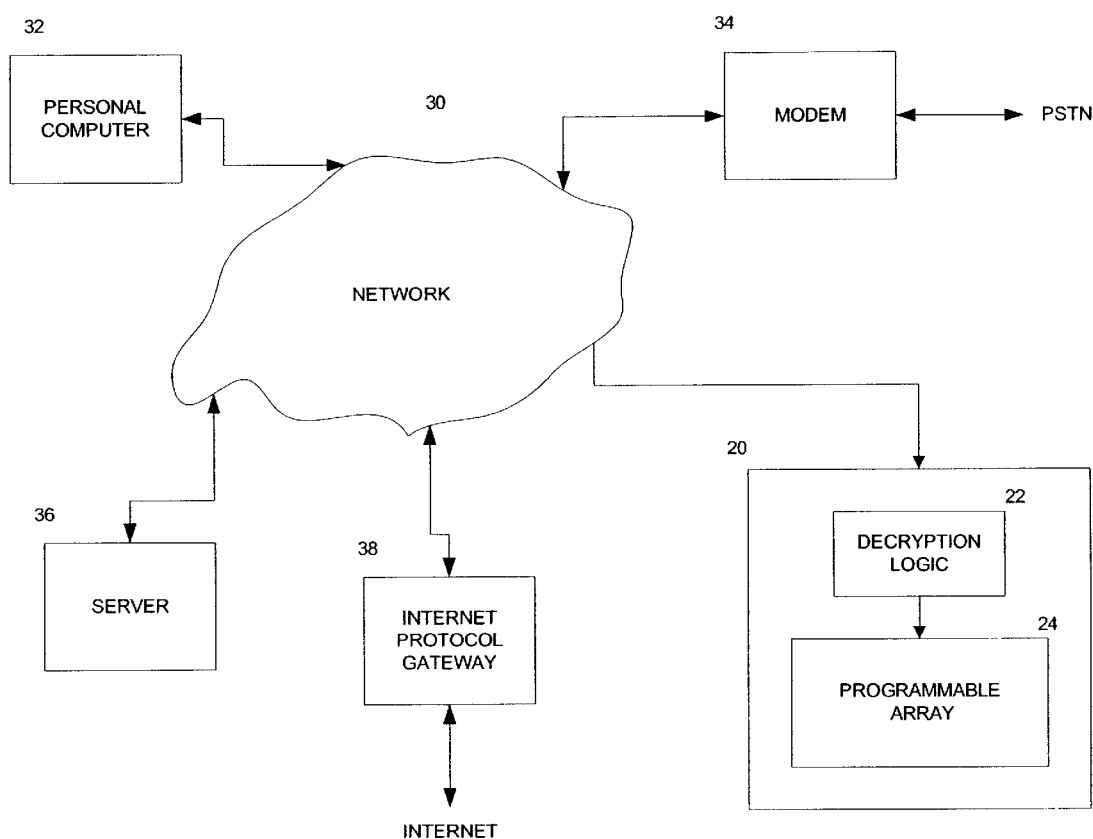
FIG. 10 is a block diagram of an example system for loading secured configuration bitstreams into a programmable device from a network according to an example embodiment of the present invention.

FIG. 10 shows a block diagram of an example system for loading secured configuration bit streams into a programmable device from a network according to an example embodiment of the present invention. Application specific integrated circuit 20, which contains decryption logic 22 and programmable array 24, may be connected to a network 30. Network 30 may be any of many types of networks, e.g., local area network (LAN), wide area network (WAN), etc. Network 30 may also have many other devices connected to it, for example, one or more personal computers 32, one or more servers 36, one or more modems 34, and/or one or more gateways or interfaces to other networks and/or systems such as internet protocol gateway 38 which provides a connection for network 30 (and devices attached thereto) to the internet. Modem 34 may provide connection from network 30 to a public switched telephone network (PSTN). Any device connected to the network may contain configuration data that may be transferred across the network to application specific integrated circuit 20 to be downloaded into the programmable array 24. According to the present invention, the configuration data may be encrypted before transport across the network to application specific integrated circuit 20 therefore providing security and authentication checking of the configuration data before being loaded into programmable array 24. Any of the devices connected to network 30 (e.g., personal computers, servers, modems, etc.), may contain memory with one or more encrypted configuration data.

Figure 11:
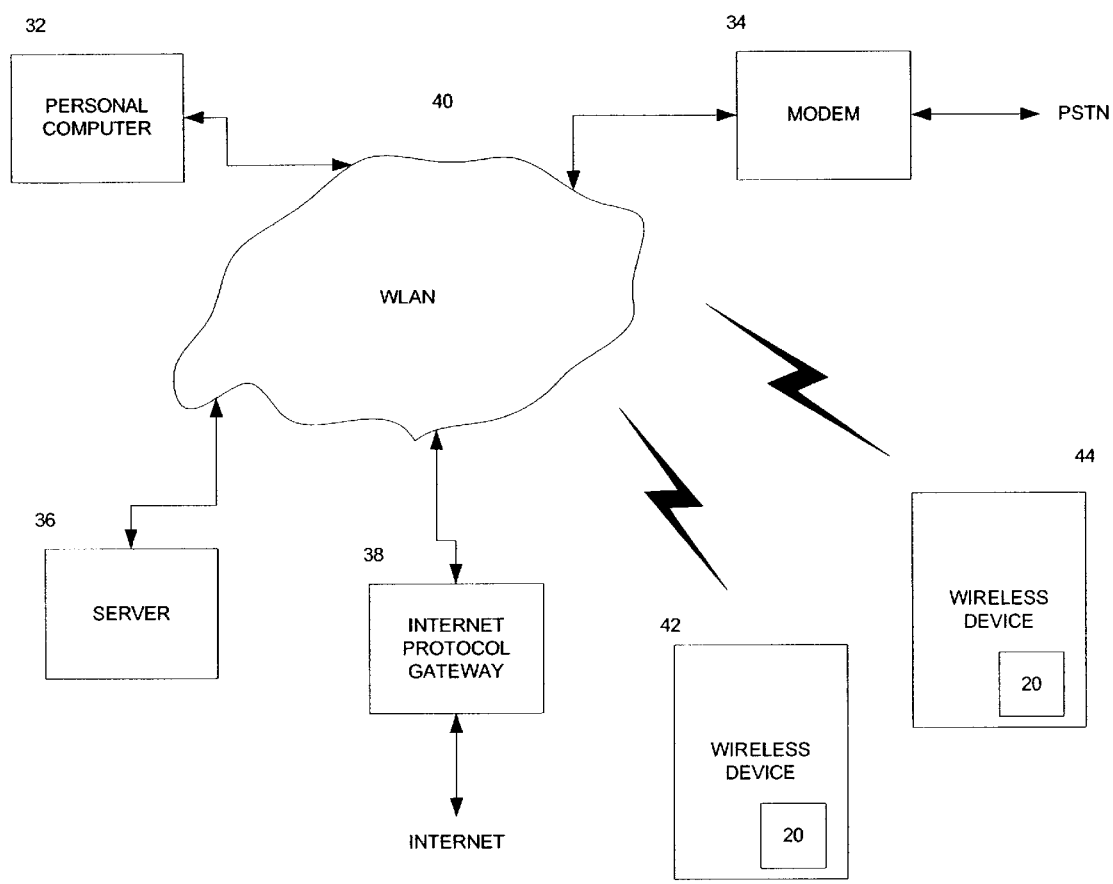
FIG. 11 is a block diagram of an example system for loading secured configuration bitstreams into a programmable device contained in a mobile device from a network according to an example embodiment of the present invention.

FIG. 11 shows a block diagram of an example system for loading secured configuration bit streams into a programmable device contained in a mobile device from a network according to an example embodiment of the present invention. As shown in FIG. 11, application specific integrated circuit 20 may be part of a wireless device 42 or 44. Wireless device 42 and 44 may be a wireless phone, portable computer, personal digital assistant (PDA), or any other wireless device. These wireless devices 42 and 44 may be part of a wireless local area network 40. Similar to the network shown in FIG. 10, wireless local area network (WLAN) may have connections to many other devices. These devices may have a physical connection or a wireless connection similar to devices 42 and 44 to the WLAN. A programmable array of application specific integrated circuit 20 may be loaded with configuration bit streams from any of the devices that are connected to the wireless local area network. Therefore, wireless devices may be dynamically reconfigured by other devices connected to the network. For example, if wireless device 42 was a wireless telephone, configuration bit streams may be received by wireless device 42 to configure the phone to incorporate new features, speech encoding, network functions, changes in telephone ability, etc., without any required hardware changes to the mobile phone. Due to the encryption of the configurations bit streams sent across the network, and the decryption and verification done by the mobile phone before storing the configuration bit stream into the programmable array, the bit streams are secure and the mobile phone is protected from receiving incorrect erroneous or modified bit stream data.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A system for secured configuration data for a programmable device comprising:
at least one memory device, the at least one memory device storing configuration data comprising at least one configuration bitstream and an associated authentication tag for each at least one configuration bitstream, each authentication tag created using one associated at least one configuration bitstream;
a programmable device operably connected to the at least one memory device, the programmable device receiving one of the at least one configuration bitstream, the programmable device using the associated authentication tag of the one of the at least one configuration bitstream to verify that the one of the at least one configuration bitstream is authentic, the programmable device loading the one of the at least one configuration bitstream if the one of the at least one configuration bitstream is authentic.

2. The system according to claim 1, wherein the configuration data is encrypted and stored in the at least one memory device.

3. The system according to claim 1, wherein the authentication tag is created by applying a hash function to the at least one configuration bitstream.

4. The system according to claim 2, wherein the configuration data is encrypted using a secret key of the programmable device.

5. The system according to claim 4, wherein the secret key is hardwired on the programmable device.

6. The system according to claim 1, wherein the programmable device is a programmable logic array.

7. The system according to claim 2, wherein a first secret key is used to encrypt the configuration data.

8. The system according to claim 7, the programmable device having a second key, wherein the second key is used to encrypt the first key.

9. A method for secured configuration data for a programmable device comprising:
generating a bitstream, the bitstream used for configuration of a programmable device;
generating an authentication tag using the bitstream, the authentication tag being appended to the bitstream forming configuration data;
encrypting the configuration data using a key associated with the programmable device;

receiving the encrypted configuration data at the programmable device;

decrypting the encrypted configuration data using the key producing a received bitstream with appended authentication tag;

separating the received bitstream from the appended authentication tag;

generating a second authentication tag using the received bitstream;

comparing the appended authentication tag with the second authentication tag to determine if they are equal; and configuring the programmable device using the received bitstream if the appended authentication tag and the second authentication tag are equal.

10. The method according to claim 9, comprising generating the authentication tag using a hash function.

11. The method according to claim 9, comprising storing the encrypted configuration data before the receiving.

12. A method for secured configuration data for a programmable device comprising:

generating a bitstream, the bitstream used for configuration of a programmable device;

generating an authentication tag using the bitstream, the authentication tag being appended to the bitstream forming configuration data;

generating a secret key;

encrypting the configuration data using the secret key;

encrypting the secret key using a second key, the encrypted secret key being appended to the encrypted configuration data;

receiving the encrypted secret key and the appended encrypted configuration data at a programmable device;

separating the encrypted secret key from the appended encrypted configuration data;

decrypting the encrypted secret key using the second key producing a received secret key;

decrypting the encrypted configuration data using the received secret key producing a received bitstream with appended authentication tag;

separating the received bitstream from the appended authentication tag;

generating a second authentication tag using the received bitstream;

comparing the appended authentication tag with the second authentication tag to determine if they are equal; and configuring the programmable device using the received bitstream if the appended authentication tag and the second authentication tag are equal.

13. The method according to claim 12, comprising generating the authentication tag using a hash function.

14. The method according to claim 12, comprising storing the encrypted configuration data before the receiving.

15. A dynamically reconfigurable mobile device connected to a Wireless Local Area Network (WLAN) comprising:

a WLAN interface; and a programmable device, the programmable device receiving encrypted configuration data comprising a configuration bitstream with appended associated authentication tag from the WLAN, the programmable device using the associated authentication tag to verify that the configuration bitstream is authentic, the programmable device loading the configuration bitstream if the configuration bitstream is authentic thereby dynamically configuring the mobile device.

* * * * *